(12) United States Patent
Seo et al.

(10) Patent No.: US 9,852,360 B2
(45) Date of Patent: Dec. 26, 2017

(54) DATA CLUSTERING APPARATUS AND METHOD

(71) Applicant: SAMSUNG SDS CO., LTD., Seoul (KR)

(72) Inventors: Bum Joon Seo, Seoul (KR); Hyung Chan Kim, Seoul (KR); Kyu Sam Oh, Seoul (KR); Soon Hwan Kwon, Seoul (KR); Min Hwan Oh, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 394 days.

(21) Appl. No.: 14/305,051

(22) Filed: Jun. 16, 2014

(65) Prior Publication Data

US 2014/0372444 A1    Dec. 18, 2014

(30) Foreign Application Priority Data

Jun. 14, 2013  (KR) ........................ 10-2013-0068467

(51) Int. Cl.
*G06F 17/30* (2006.01)
*G06K 9/62* (2006.01)

(52) U.S. Cl.
CPC ................................ *G06K 9/6218* (2013.01)

(58) Field of Classification Search
CPC .................................................. G06K 9/6218
See application file for complete search history.

(56) References Cited

U.S. PATENT DOCUMENTS

| 6,026,397 A * | 2/2000 | Sheppard ............ G06F 17/3071 |
| 2002/0099702 A1 | 7/2002 | Oddo |
| 2012/0197560 A1 * | 8/2012 | Kuhns .................... G01R 22/10 |
| | | 702/60 |
| 2012/0296906 A1 | 11/2012 | Tsai et al. |

\* cited by examiner

*Primary Examiner* — Apu Mofiz
*Assistant Examiner* — Dara J Glasser
(74) *Attorney, Agent, or Firm* — Sughrue Mion, PLLC

(57) ABSTRACT

Provided are a data clustering apparatus and method, which can rapidly and accurately cluster data. The data clustering apparatus includes an index discriminating unit discriminating an index corresponding to an input position of new data input to a space for data clustering, including a lattice-type segmented space having lattice unit spaces set with different indexes, and a clustering unit creating a new cluster in the discriminated index using the input new data as a representative value when a cluster is not created at the discriminated index.

11 Claims, 9 Drawing Sheets

[Fig. 1]
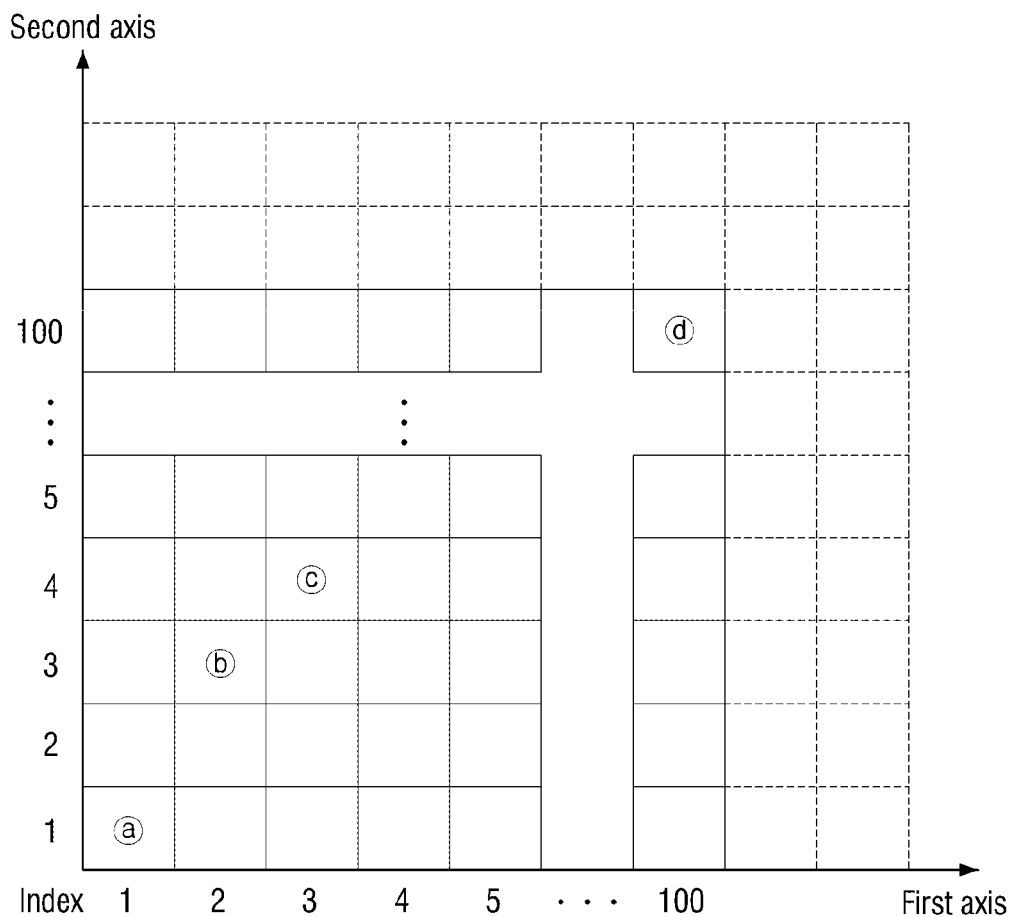

【Fig. 2】
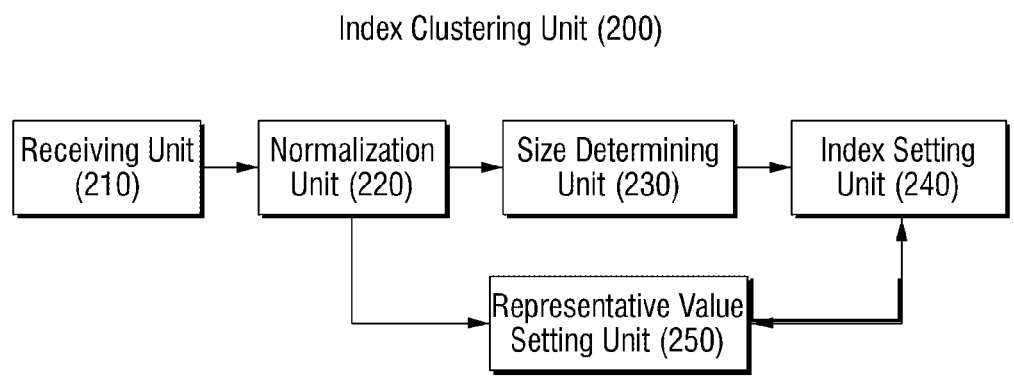
【Fig. 3】
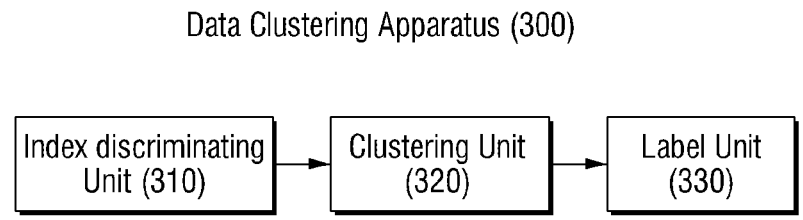

[Fig. 4]
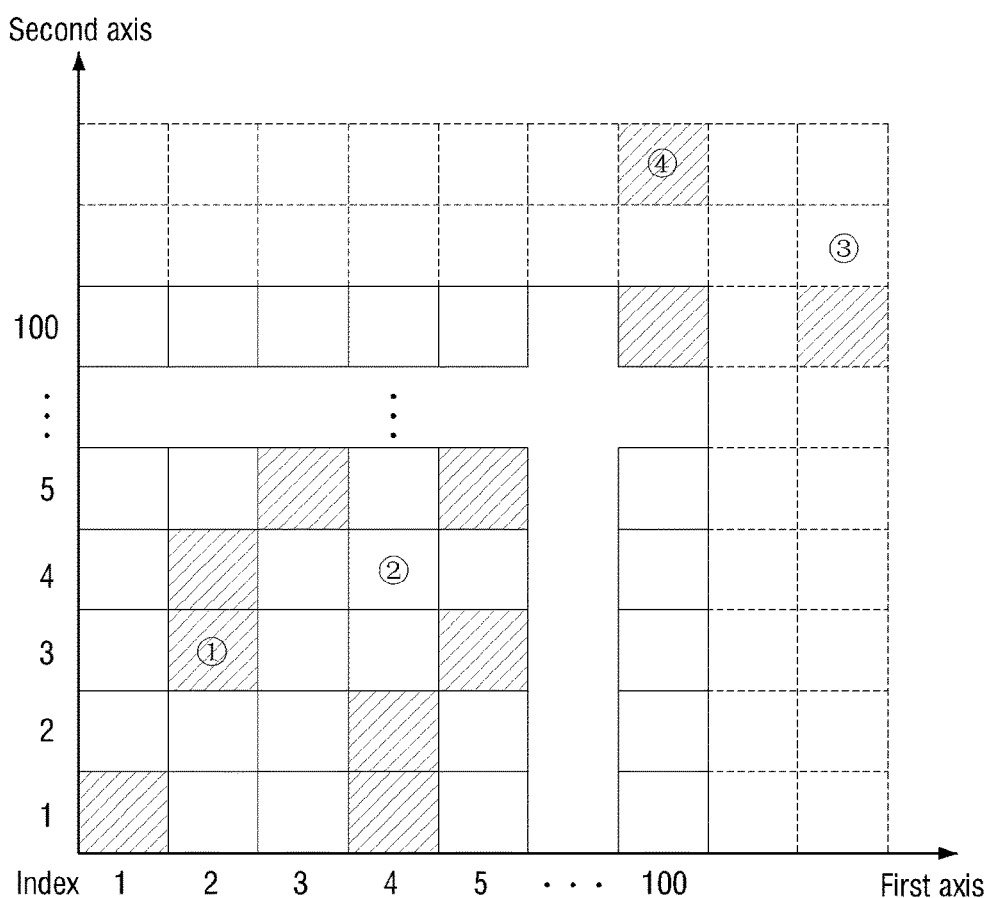

[Fig. 5]
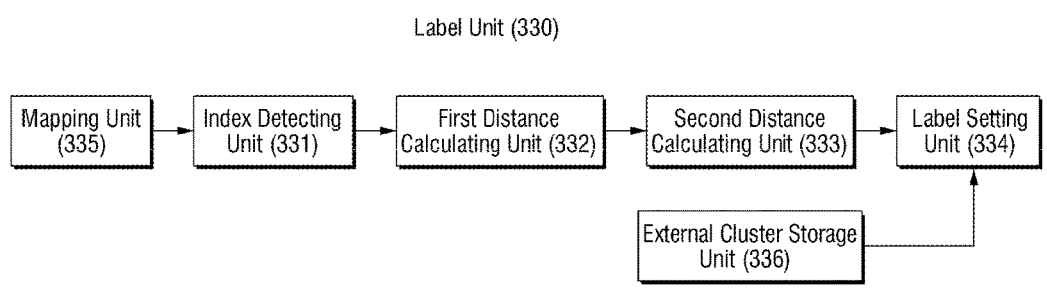

[Fig. 6]
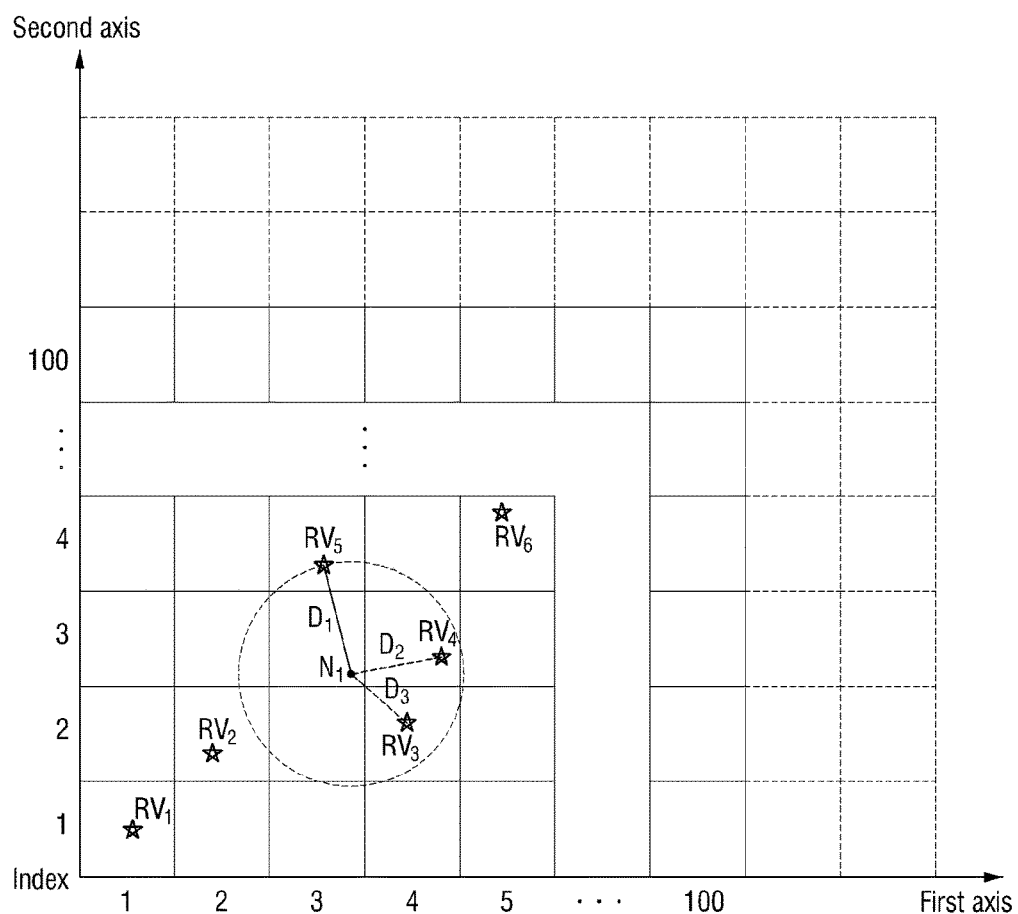

[Fig. 7]
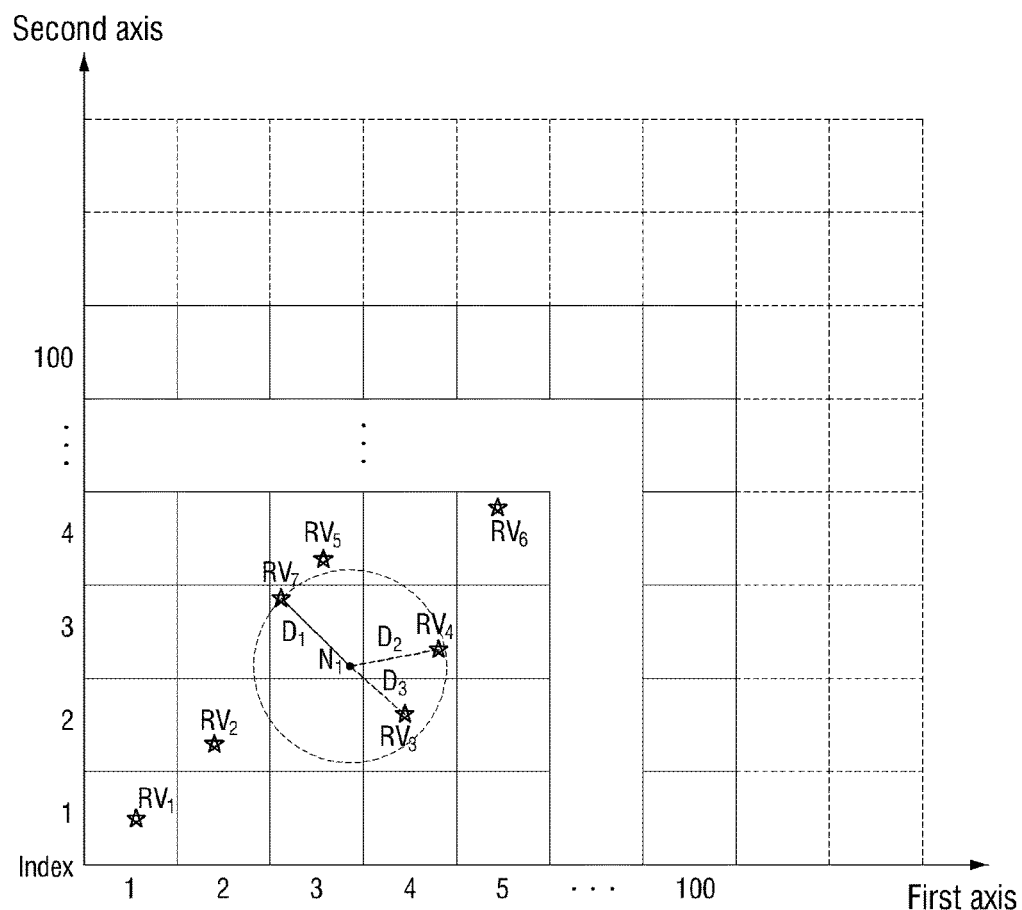

[Fig. 8]
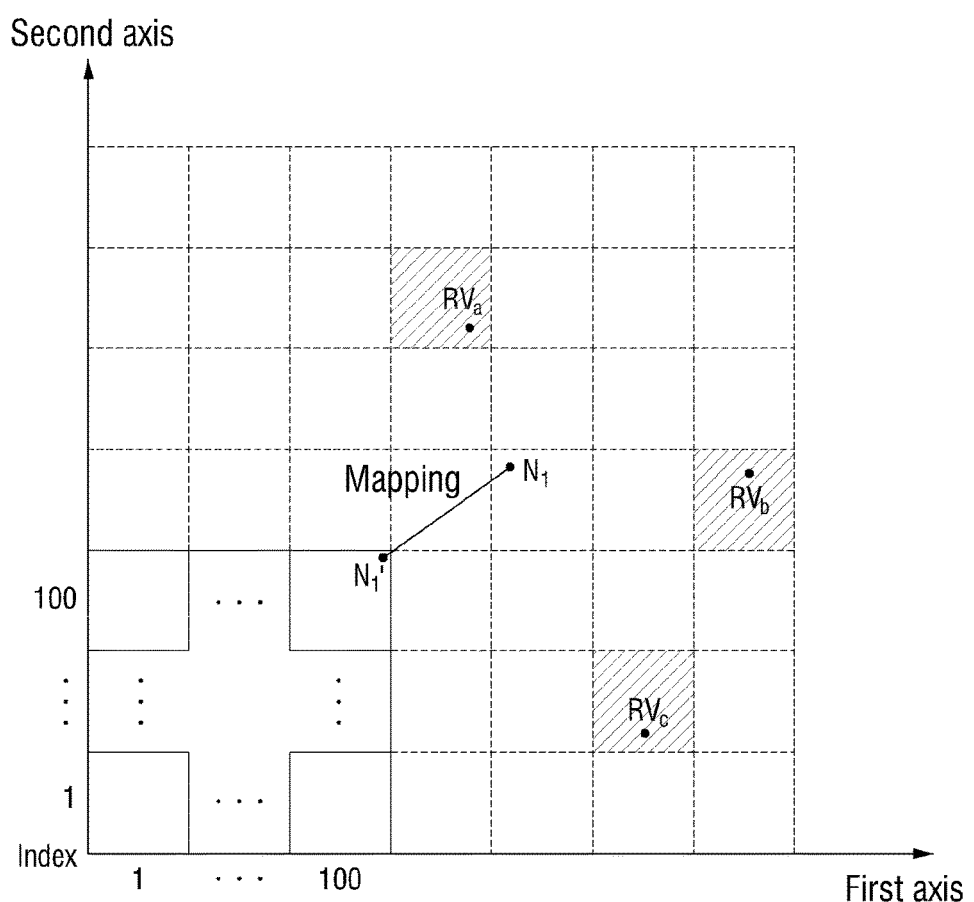

[Fig. 9]
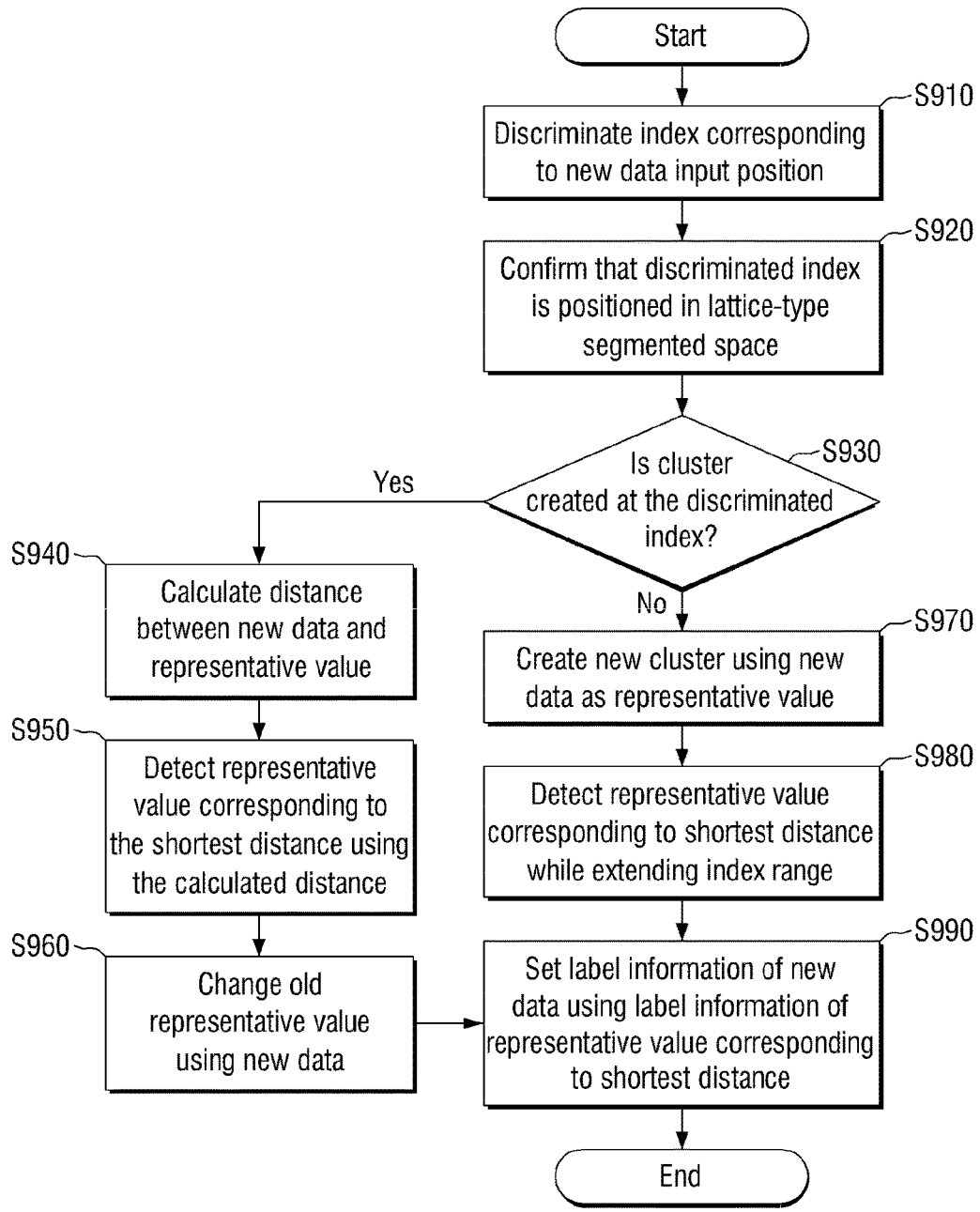

[Fig. 10]
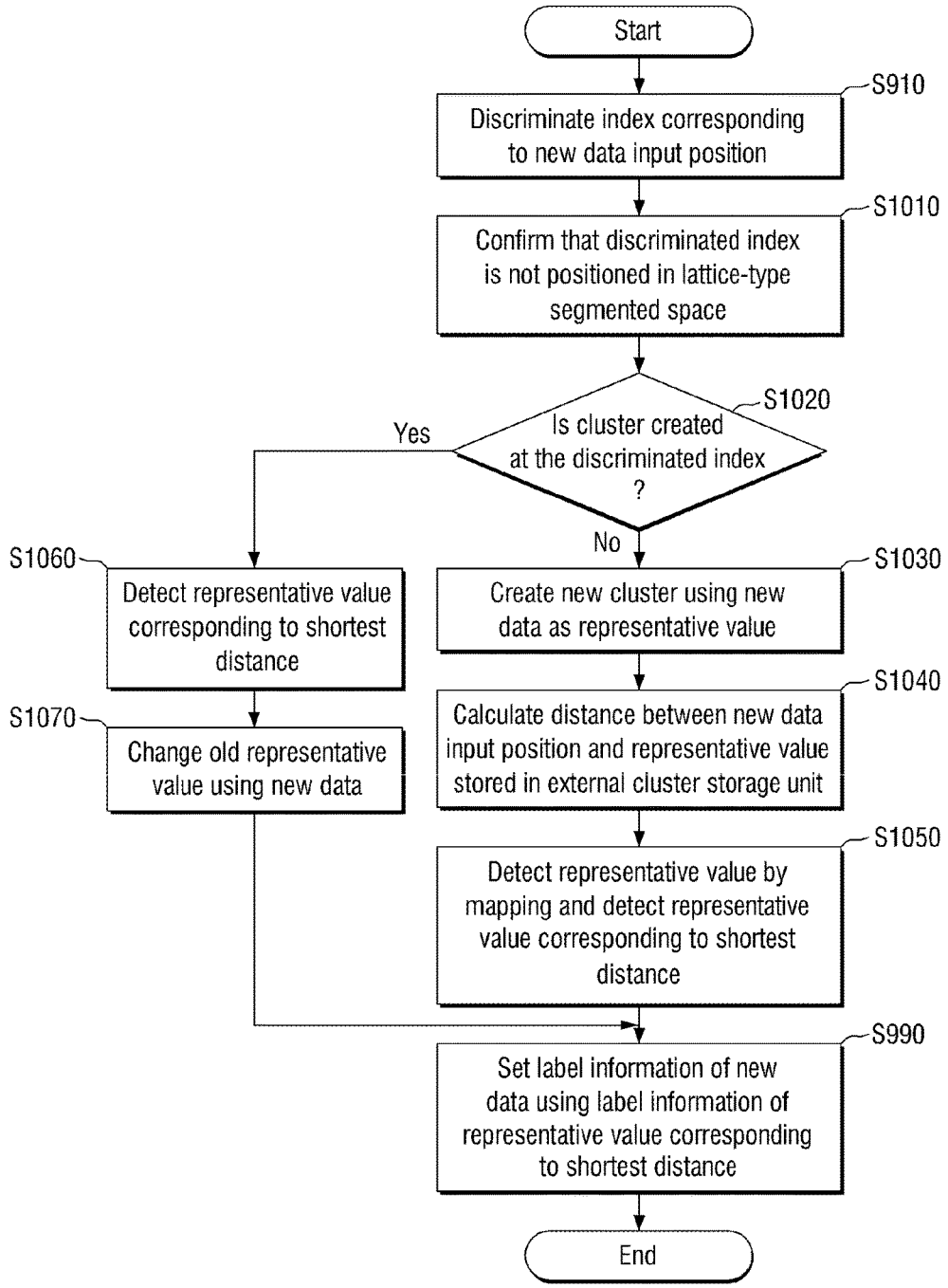

DATA CLUSTERING APPARATUS AND METHOD

CROSS-REFERENCE TO RELATED APPLICATION

This application claims priority from Korean Patent Application No. 10-2013-0068467 filed on Jun. 14, 2013 in the Korean Intellectual Property Office, the disclosure of which is incorporated herein by reference in its entirety.

BACKGROUND OF THE INVENTION

1. Field of the Invention

The present invention relates to a data clustering apparatus and method. More particularly, the present invention relates to a data clustering apparatus and method, which can rapidly and accurately cluster data.

2. Description of the Related Art

A cluster means similar data among numerous pieces of data being clustered into a group. Clustering refers to a technique of classifying data having similar features among numerous pieces of data into multiple groups.

In the existing cluster-based clustering method, such as K-Means, K-Medoids, or Canopy, if new data is input, a distance between the new data and each of all clusters is computed to find a cluster that is closest to the input data to then be clustered.

However, the existing clustering method poses a problem that a computational quantity may greatly increase according to an increase in the data size. In order to overcome the problem, the number of clusters may be reduced. In this case, however, feature information of original data may be lost, making it difficult to achieve accurate data analysis.

Among the existing clustering methods, a clustering method using a hierarchical algorithm, such as a K-D Tree, does not require distance computations for all clusters. In the clustering method using a hierarchical algorithm, however, if the number N of dimensions becomes greater than 10, the number of nodes to be searched for a space may drastically increase, resulting in slow computation. In addition, since the hierarchical algorithm, such as K-D Tree, is not well balanced, nodes should be periodically rearranged to establish node-to-node balance.

In addition, according to the existing clustering methods, there exist scattered pieces of data, which are not effective in clustering. If the scattered pieces of data are clustered using the existing clustering method, inconsistent clustering results are obtained each time clustering is performed. Therefore, in a case of clustering the scattered data using the existing clustering method, there is an increasing possibility of re-clustering during clustering, resulting in an increase in the computational quantity.

In order to reduce the computational quantity, a data dimension reducing technique may be used. In this case, however, there may be a data loss and outlier data of a reduced dimension cannot be discriminated, making it difficult to achieve accurate clustering.

Furthermore, like in a building energy management system (BEMS), there are increasing cases of measuring various pieces of data using many different types of sensors. However, there are few techniques for creating clusters by combining various pieces of data measured by many different types of sensors. Moreover, there are few techniques for rapidly and effectively clustering various pieces of data continuously measured by many different types of sensors.

As described above, since the data measured by many different types of sensors in such a place as the BEMS is large-scale data and scattered data, rapid, accurate clustering is difficult to achieve. Accordingly, it is necessary to propose techniques of creating a cluster by combining a variety of pieces of data of different types and techniques of effectively clustering newly input data of different types.

SUMMARY OF THE INVENTION

The present invention provides a data clustering apparatus and method, which can effectively cluster multi-dimensional, large-scale and scattered data.

The present invention also provides a data clustering apparatus and method, which can rapidly and accurately cluster data by reducing a computational quantity, compared to the existing clustering method, by recognizing an input position of new data using indexes.

The present invention also provides a data clustering apparatus and method, which can be efficiently adopted in clustering large-scale, scattered data, compared to the general clustering technique.

The present invention also provides a data clustering apparatus and method, which can rapidly cluster newly input data and can detect a representative value of a cluster that is closest to the newly input data by creating a lattice-type segmented space and setting an index to the lattice-type segmented space using the set index.

The above and other objects of the present invention will be described in or be apparent from the following description of the preferred embodiments.

According to an aspect of the present invention, there is provided a data clustering apparatus including an index discriminating unit discriminating an index corresponding to an input position of new data input to a space for data clustering, including a lattice-type segmented space having lattice unit spaces set with different indexes, and a clustering unit creating a new cluster in the discriminated index using the input new data as a representative value when a cluster is not created at the discriminated index.

According to another aspect of the present invention, there is provided a data clustering apparatus including an index discriminating unit discriminating an index corresponding to a position of new data input to a space for data clustering, including a lattice-type segmented space having lattice unit spaces set with different indexes, and a clustering unit allowing the new data to be included in a cluster created in a lattice unit space, when the cluster is created in the lattice unit space indicated by the discriminated index, and changing an old representative value of the created cluster using the new data.

According to still another aspect of the present invention, there is provided a data clustering method including discriminating an index corresponding to a position of new data input to a space for data clustering, including a lattice-type segmented space having lattice unit spaces set with different indexes, and clustering to create a new cluster to the discriminated index using the input new data as a representative value when a cluster is not created at the discriminated index.

According to a further aspect of the present invention, there is provided a data clustering method including discriminating an index corresponding to a position of new data input to a space for data clustering, including a lattice-type segmented space having lattice unit spaces set with different indexes, and clustering to allow the new data to be included in a cluster when the cluster is created in the lattice unit space indicated by the discriminated index, and to change an old representative value included in the created cluster using the new data.

Embodiments of the present invention provide at least the following effects.

As described above, the data clustering apparatus and method according to the present invention can reduce a computational quantity required for clustering, compared to the conventional clustering method.

In addition, the data clustering apparatus and method according to the present invention can rapidly and accurately clustering large-scale data, compared to the conventional clustering method.

In addition, the data clustering apparatus and method according to the present invention can rapidly and accurately clustering scattered data, which is difficult to be clustered, using the conventional clustering method.

Further, the data clustering apparatus and method according to the present invention can detect a representative value that is closest to newly input data using a reduced computational quantity, compared to the conventional clustering method.

In addition, label information of a representative value closest to newly input data can be used in setting label information of the newly input data.

BRIEF DESCRIPTION OF THE DRAWINGS

The above and other features and advantages of the present invention will become more apparent by describing in detail preferred embodiments thereof with reference to the attached drawings in which:

FIG. 1 illustrates an example of a lattice-type segmented space having indexes set thereto in a two-dimensional (2D) space;

FIG. 2 is a block diagram of an index clustering unit;

FIG. 3 is a block diagram of a data clustering apparatus according to an embodiment of the present invention;

FIG. 4 illustrates four cases in an example result of index discrimination performed by an index discriminating unit;

FIG. 5 is a block diagram of a label unit of the data clustering apparatus according to an embodiment of the present invention;

FIG. 6 illustrates an example of a label setting unit detecting a representative value closest to new data;

FIG. 7 is a diagram illustrating a procedure of a label setting unit tracing a representative value that is closest to an input position of new data when new data is input to lattice unit spaces having clusters set thereto;

FIG. 8 is a diagram illustrating an operation of a label setting unit when an input position of new data is positioned at an external space of a lattice-type segmented space;

FIG. 9 is a flowchart of a data clustering method according to an embodiment of the present invention, and FIG. 10 is a flowchart of a data clustering method according to another embodiment of the present invention.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

It will be understood that when an element or layer is referred to as being "connected to" or "coupled to" another element or layer, it can be directly on, connected or coupled to the other element or layer or intervening elements or layers may be present. In contrast, when an element is referred to as being "directly connected to" or "directly coupled to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A building energy management system (BEMS) is a system for managing the energy of a building. In order to manage the energy of a building, various kinds of information are collected by numerous kinds of sensors, including a temperature sensor, a humidity sensor, a $CO_2$ concentration sensor, a gas consumption sensor, and a power consumption sensor, of the building, that are detected by sensors.

Therefore, many different kinds of values are measured by sensors of the BEMS. In addition, the measured values may exist over a wide range according to various environmental parameters, for example, according to whether the sensors are installed inside or outside a building, whether the sensors operate at night or during the day, or whether the sensors are installed on the first floor or the 20th floor of the building.

Recently, an increasing number of systems collect various pieces of large-capacity data using many sensors, for example, not only the BEMS but a smart grid associated system, such as a facility management system (FMS) or a building automation system (BAS).

Many pieces of data collected by various systems, such as the BEMS, may be large-capacity data or scattered data having a wide range of information. Existing clustering methods for large-capacity data include, for example, K-means, K-medoids, Canopy, hierarchical algorithm.

According to the existing clustering methods, when new data is input, a distance between the new data and each of all clusters is computed to find a cluster that is closest to the input data to then be clustered. Therefore, when there is large-capacity data in the cluster, the existing clustering methods may pose a problem of a greatly increasing computational quantity. In addition, when there is scattered data in the cluster, clustering may not be efficiently performed.

By contrast, the data clustering apparatus according to the present invention can reduce a computational quantity required in clustering using the lattice-type segmented space having indexes set thereto and can efficiently cluster scattered data.

Before describing a clustering procedure performed when new data is input using the data clustering apparatus according to an embodiment of the present invention, the lattice-type segmented space having indexes set for rapidly and accurately clustering data using the data clustering apparatus according to an embodiment of the present invention will first be described.

The lattice-type segmented space means a space segmented into a lattice-structured space having the same volume with a total or part of a space for clustering, into which new data can be input. The term "space" used herein may mean a space of three or more dimensions. Throughout the specification of the present invention, the term "space" may be understood to encompass a two-dimensional plane. That is to say, the present invention can also be applied to a 2D space. When the space for clustering is a 2D space, the phrase "lattice-type segmented space" used herein may be understood as a plane or a 2D space segmented in a lattice structure. That is to say, the space for clustering may be produced by as many axes as the dimensions. For example, when the space for clustering is a 3D space, there are three axes, including a first axis, a second axis and a third axis. The space for clustering may be a 3D space defined by the first axis, the second axis and the third axis.

That is to say, the phrase "space for clustering" used throughout the specification of the present invention may mean a space defined by the respective axes. In FIG. 1, as will later be described, the space for clustering means the entire space indicated by solid lines and dotted lines. The "lattice-type segmented space" is a space existing in total or in part of the space for clustering, and the size of the lattice-type segmented space may be determined by a size determining unit to later be described with reference to FIG. 2. The lattice-type segmented space used herein means the total space segmented into uniform sizes. That is to say, in FIG. 1, as will later be described, the "lattice-type segmented space" means a group of lattice unit spaces ranging from an index (1,1) to an index (100,100). The "lattice unit space" means a space corresponding to one index.

Hereinafter, for a better understanding of the data clustering apparatus according to the present invention, the lattice-type segmented space having indexes set thereto in a 2D space defined by a first axis and a second axis will first be described and an application example of the data clustering apparatus according to the present invention will later be described.

FIG. 1 illustrates an example of a lattice-type segmented space having indexes set thereto in a 2D space.

The 2D space shown in FIG. 1 may be part of the lattice-type segmented space set in a space of three or more dimensions.

Referring to FIG. 1, the first axis and the second axis may indicate values measured from different sensors. For example, the first axis may be an axis along which values measured by a first sensor are indicated, and the second axis may be an axis along which values measured by a second sensor are indicated. The values indicated along the first and second axes may be set or may vary according to the environment of a system adopting the present invention.

Referring further to FIG. 1, each of the first axis and the second axis is divided into multiple sections identified by digits of 1 to 100. Ordered pairs set in each axis correspond to indexes of a pertinent section. In FIG. 1, the index of a section ⓐ is (1,1), the index of a section ⓑ is (2,3), the index of a section ⓒ is (3,4), and the index of a section ⓓ is (100,100).

The indexes are not necessarily set as digits or ordered pairs, and different indexes are preferably set to the respective sections.

The creating of the lattice-type segmented space having indexes set in the space for clustering may be performed by an index setting unit 240.

FIG. 2 is a block diagram of an index clustering unit.

Referring to FIG. 2, the index clustering unit 200 may include a receiving unit 210, a normalization unit 220, a size determining unit 230, an index setting unit 240 and a representative value setting unit 250.

The lattice-type segmented space having indexes created by the clustering unit 200, that is, the space segmented into 10000 subdivided spaces from the index (1,1) to the index (100,100) (segmented spaces indicated by solid lines in FIG. 1) will now be described with reference to FIGS. 1 and 2.

The receiving unit 210 may receive data to be input to the space for clustering from sensors and various kinds of devices. The data received by the receiving unit 210 may be not only time series data but data other than the time series data, but not limited thereto.

The size determining unit 230 may set a minimum value and a maximum value among values indicated along the first axis, received by the receiving unit 210 before the new data is input, to determine the size of the first axis of the lattice-type segmented space to which indexes are to be set. In addition, the size determining unit 230 may set a minimum value and a maximum value among values indicated along the second axis, received by the receiving unit 210 before the new data is input, to determine the size of the second axis of the lattice-type segmented space to which indexes are to be set.

The values indicated along the first axis and the second axis may be values received immediately before the new data is input or may be values received until a predetermined time is reached.

The lattice-type segmented space to which indexes are to be set may have the same size with or a smaller size than the space for clustering (that is, the 2D space defined by first and second axes of the lattice-type segmented space to which indexes are to be set).

If the size of the lattice-type segmented space to which indexes are to be set is determined using the minimum value and the maximum value, the index setting unit 240 may divide the size-determined space into a lattice-type segmented space having the same size according to the sensitivity set by the user, the environment of a system adopting the present invention, and the determined space size. In FIG. 1, the sensitivity is set to 100, and the index setting unit 240 divides the first axis into 100 sections and the second axis into 100 sections, thereby creating 10000 lattice unit spaces having 10000 different indexes set thereto.

The index setting unit 240 preferably set different indexes to the respective lattice unit spaces.

The representative value setting unit 250 may set representative values using the data input corresponding to a pertinent position for each of the lattice-type segmented space having different indexes.

In detail, the representative value setting unit 250 generates clusters in a space having data, among the lattice-type segmented spaces, and may set a mean of the data existing in the space as a representative value of the created clusters. One cluster may be generated for each one of the lattice-type segmented spaces.

When one piece of data exists in the space having the clusters generated therein, the representative value setting unit 250 sets the one piece of data as a representative value. When two or more pieces of data exist in the clusters, the representative value setting unit 250 may set a mean of the two or more pieces of data as a representative value, but aspects of the present invention are not limited thereto. The representative value of the cluster may be set using two or more pieces of data existed in the cluster.

The normalization unit 220 may normalize the data received by the receiving unit 210.

The normalization unit 220 may perform normalization for each axis to generate clusters through a reasonable crossing of the respective axes.

When the normalization unit 220 does not perform normalization for each axis, a considerable difference in the proportion between the respective axes of the clusters generated by the index clustering unit 200 is generated due to difference in values measured by the respective sensors, resulting in inefficient distribution of the data having the values measured for each axis. In addition, the normalization unit 220 may increase the ease of comparison between the measured values different average and unit.

The normalization unit 220 obtains a mean and a variance of values corresponding to the first axis among the pieces of data received by the receiving unit 210 and normalizes the values corresponding to the first axis using the obtained mean and variance of the values corresponding to the first axis. In addition, the normalization unit 220 obtains a mean and a variance of values corresponding to the second axis among the pieces of data received by the receiving unit 210, and normalizes the values corresponding to the second axis using the obtained mean and variance of the values corresponding to the second axis.

If the data received by the receiving unit 210 is normalized by the normalization unit 220, the size determining unit 230 may determine the size of the lattice-type segmented space to which indexes are to be set using the normalized data. In addition, if the data received by the receiving unit 210 is normalized by the normalization unit 220, the representative value setting unit 250 may set the representative value using the normalized data existing in the lattice-type segmented space.

In detail the normalization unit 220 may perform normalization using G-score. The G-score is one of normalized scores and is obtained by dividing a deviation score from an average as a normalized score by a standard deviation. In detail, the G-score can be obtained by:

$$Z = \frac{(X - X')}{S} \quad (1)$$

where Z is a converted score obtained by a Z-score, X is a value for each axis, X' is a mean of various values indicated along each axis, and S is a standard deviation of various values indicated along each axis.

Referring again by FIG. 1, sections indicated by dotted lines also is spaces for clustering. However, sections indicated by dotted lines refer to spaces without indexes set because of spaces being in ranges of values not existing in data received before new data is input.

Next, referring again to FIG. 1 the lattice unit spaces constituting the lattice-type segmented space may have different sides. That is to say, since a minimum value and a maximum value for each axis (or a normalized minimum value and a normalized maximum value) are different, the respective sides of the lattice unit spaces may have different lengths.

If data is input to the spaces indicated by the dotted lines by clustering new data according to the present invention, indexes may be set to the spaces indicated by the dotted lines. In addition, since multiple pieces of data are input to the spaces indicated by the dotted lines, ranges of the previously set indexes may be extended or a space corresponding to an index may have an increased size.

FIG. 3 is a block diagram of a data clustering apparatus according to an embodiment of the present invention.

Referring to FIG. 3, the data clustering apparatus 300 according to an embodiment of the present invention may include an index discriminating unit 310 and a clustering unit 320. The data clustering apparatus 300 may further include a label unit 330.

The index discriminating unit 310 may discriminate an index corresponding to an input position of new data for the space for clustering.

If the index discriminating unit 310 discriminates an index corresponding to the input position of new data, it is possible to acquire position information of a lattice unit space corresponding to the discriminated index, information on whether there is a cluster created in the lattice unit space corresponding to the discriminated index, information on a representative value of the cluster when there is a cluster corresponding to the discriminated index, and position information of the representative value.

In detail, the index discriminating unit 310 may discriminate, by ratio, indexes of spaces where new data is positioned, using information on the minimum value and the maximum value of each axis determining the size of the lattice-type segmented space, information on sensitivity or the number of indexes set to the lattice-type segmented space.

When the minimum value and the maximum value of each axis determining the size of the lattice-type segmented space are a normalized minimum value and a normalized maximum value of the values received by the receiving unit 210, the pieces of data existing in the lattice-type segmented space are normalized data. Therefore, the input new data may also be normalized data resulting from normalization by the normalization unit 220.

In more detail, the index discriminating unit 310 may discriminate the index corresponding to the input position of the new data using Equations (2) and (3).

When the new data is not normalized data, it may be normalized using Equation (2). The normalization may be performed by the normalization unit 220. In the normalization performed by the normalization unit 220, the size of the lattice-type segmented space is determined using the values normalized by the normalization unit 220, and when there is normalized data at a corresponding position, it is necessary to perform the normalization. In Equation (2), new data is normalized using Z-Score.

$$z' = \frac{x' - E[X]}{\sigma[X]} \quad (2)$$

where x' is new data, z' is normalized new data, $E[x]$ is a mean of all values indicated along each axis, and $\sigma[x]$ is a standard deviation of all values indicated along each axis. That is to say, the normalization unit 220 may perform normalization on each of the values indicated along each axis using Equation (2).

$$\text{Index} = \text{ceiling}\left[\frac{(z' - \min[z])}{\max[z] - \min[z]} \times \frac{1}{grpNum}\right] \quad (3)$$

In Equation (3), Index is an index of normalized new data. When the new data includes ordered pairs of the values indicated along each axis, the index discriminating unit 310 may discriminate an index of each of the values indicated along each axis. In addition, z' is normalized new data, min[z] is a minimum value among the values indicated along each axis, max[z] is a maximum value among the values indicated along each axis, grpNum is the number of indexes of each axis, and ceiling is a Celing function.

For example, when the normalized new data includes an ordered pair (value of first axis, value of second axis), a first-axis index that is an index of a value of the first axis can be discriminated using the minimum value among the values indicated along each axis, the maximum value among the values indicated along each axis, and the number of indexes of the first axis. Likewise, a second-axis index that is an index of a value of the second axis can be discriminated using the minimum value among the values indicated along the second axis, the maximum value among the values indicated along the second axis, and the number of indexes of the second axis. The index discriminating unit 310 may discriminate an ordered pair (index of first axis, index of second axis) as a final index of a space where the normalized new data is positioned.

FIG. 4 illustrates four cases in an example result of index discrimination performed by an index discriminating unit.

In FIG. 4, the shaded sections are spaces where clusters are created, that is, spaces where there is data in the corresponding lattice unit spaces.

Referring to FIG. 4, the result of index discrimination performed by the index discriminating unit 310 may be largely classified into four cases. In the first case ①, new data is input to a certain position of a lattice-type segmented space and there is a previously created cluster at the input position of the new data. In the second case ②, new data is input to a certain position of a lattice-type segmented space while no cluster is formed at the input position of the new data.

In the third case ③, new data is input to one among spaces for clustering, other than the lattice-type segmented space while no cluster is created at the input position of the new data. In the fourth case ④, new data is input to one among spaces for clustering, other than the lattice-type segmented space and there is a previously created cluster at the input position of the new data.

In the cases ③ and ④, the new data is positioned at the space to which an index is not set. In the cases ③ and ④, the index discriminating unit 310 may determine the index of the new data input position in the same manner as in the case ① or ②. That is to say, in the cases ③ and ④, the index discriminating unit 310 may determine the index using Equation (3). However, in the cases ③ and ④, the index determined by the index discriminating unit 310 may be a value not belonging to a predetermined index range. That is to say, in FIG. 4, the index of the space for the case ③ may be (102, 101), and the index of the space for the case ④ may be (100,102).

Next, the operation of the clustering unit 320 based on the determination result of the index discriminating unit 310 will be described with reference to FIGS. 3 and 4.

First, as the discrimination result of the index discriminating unit 310, when new data is input to a certain position of a lattice-type segmented space having a previously created cluster, the new data is allowed to be included in the cluster created in a lattice unit space indicated by a corresponding index. In addition, the clustering unit 320 may change a representative value of the cluster created in the lattice unit space indicated by the index corresponding to the input position of the new data using the new data. In detail, the clustering unit 320 may change the position of the representative value to a position obtained using an internally dividing point between the new data and the representative value based on the number of pieces of data included in the created cluster. That is to say, the clustering unit 320 may change a mean value of all data included in the cluster having the input new data as a representative value. In the case ① of FIG. 4, the clustering unit 320 may allow new data to be included in the cluster created at the index (2,3) and may change the representative value existing in the index (2,3) using the new data.

Second, as the discrimination result of the index discriminating unit 310, when new data is input to a certain position of the lattice-type segmented space without a cluster created at the input position of the new data, the clustering unit 320 may create a new cluster having the new data as a representative value at a position of the lattice-type segmented space, indicated by the index corresponding to the input position of the new data. In detail, in the case ② of FIG. 4, the clustering unit 320 may create a new cluster having the new data input to the lattice unit space indicated by the index (4,4) corresponding to the input position of the new data as a representative value.

Third, as the discrimination result of the index discriminating unit 310, when new data is input to one among spaces for clustering, other than the lattice-type segmented space while no cluster is created at the input position of the new data, the clustering unit 320 may create a new cluster having the new data as a representative value at the lattice unit space indicated by the index corresponding to the input position of the new data. In detail, in the case ③ of FIG. 4, the clustering unit 320 may create a new cluster having the new data input to the lattice unit space indicated by the index (102,101) corresponding to the input position of the new data as a representative value. When the clustering unit 320 creates a new cluster in one among spaces for clustering, other than the lattice-type segmented space, the new cluster may have the same size as that of the lattice unit spaces.

Fourth, as the discrimination result of the index discriminating unit 310, when new data is input to one among spaces for clustering, other than the lattice-type segmented space and there is a previously created cluster at the input position of the new data, the clustering unit 320 may change the representative value of the cluster created at the lattice unit space indicated by the index corresponding to the input position of the new data. In detail, in the case ④ of FIG. 4, the clustering unit 320 may allow new data to be included in a cluster existing in the lattice unit space indicated by the index (100,102) corresponding to the input position of the new data as a representative value and may change the representative value existing in the cluster using the new data.

Referring again to FIG. 3, the label unit 330 will be described in detail.

The label unit 330 may detect a representative value closest to the input position of the new data using the discriminated index and different indexes set to each of the lattice unit spaces. In addition, the label unit 330 may set label information of the new data using label information of the detected representative value.

The label information collectively refers to various pieces of information concerning a pertinent representative value, including attribute information of a representative value, information on a relation between a state of a system adopting the present invention (e.g., BEMS) and the representative value.

In the conventional clustering method, in order to detect a representative value closest to the input new data, it is necessary to compute distances between the input new data and all possible representative values. However, the label unit 330 of the data clustering apparatus according to an embodiment of the present invention 300 can detect the representative value closest to the input new data just by computing distances between the input new data and representative values existing in other indexes close to the index discriminated by the index discriminating unit 310. That is to say, according to the present invention, since the position of a representative value itself is not known, position information of neighboring indexes of new data is first detected to trace the neighboring indexes, thereby acquiring position information of the representative values existing in the neighboring indexes. Therefore, according to the present invention, a computational quantity can be reduced.

The label unit 330 will now be described in more detail with reference to FIG. 5.

FIG. 5 is a block diagram of a label unit of the data clustering apparatus according to an embodiment of the present invention.

Referring to FIG. 5, the label unit 330 may include an index detecting unit 331, a first distance calculating unit 332, a second distance calculating unit 333 and a label setting unit 334. The label unit 330 may further include a mapping unit 335 and an external cluster storage unit 336.

While gradually extending an index range from the index closest to the index (Index A) discriminated by the index discriminating unit 310, the index detecting unit 331 may detect an index (Index B) having a cluster created thereat. In addition, if the index B is detected, the index detecting unit 331 may stop extending the index range.

In detail, in order for the index detecting unit 331 to detect the index B having the cluster created thereat around the index A discriminated by the index discriminating unit 310, the index range may be extended in the following manner, for example.

The index detecting unit 331 may extend the index range in various manners. Specifically, in order to reduce the computational quantity, an index having a cluster created thereat is preferably detected while extending the index range toward the index close to the index A discriminated by the index discriminating unit 310. For example, the index detecting unit 331 may detect an index having a cluster created thereat after increasing or decreasing the index indicated along the first axis from the index A corresponding to the input position of the new data by 1 (i.e., ±1), and, if no index is detected, increasing or decreasing the index indicated along the second axis from the index A by 1 (i.e., ±1). If an index is not detected even after increasing or decreasing the index indicated along the second axis from the index A by 1 (i.e., ±1), the index detecting unit 331 may detect an index having a cluster created thereat by increasing or decreasing the index indicated along both of the first and second axes from the index A each by 1 (i.e., ±1). If an index is not still detected even after increasing or decreasing the index indicated along both of the first and second axes from the index A each by 1 (i.e., ±1), the index detecting unit 331 may detect an index having a cluster created thereat by increasing or decreasing the index indicated along both of the first and second axes from the index A by 2 (i.e., ±2).

That is to say, as described above, the index detecting unit 331 may detect an index having a cluster created thereat while extending the index range from the index close from the index A corresponding to the input position of the new data. However, in order for the index detecting unit 331 to detect an index having a cluster created thereat, the index indicated along the first axis is not necessarily first increased or decreased by 1 from the index A. That is to say, the index indicated along the second axis may first be increased or decreased by 1 from the index A. Alternatively, the index indicated along both of the first and second axes may be increased or decreased by 1 from the index A. Alternatively, the index detecting unit 331 may extend the index range in a clockwise direction or in a counterclockwise direction.

The method of the index detecting unit 331 extending the index range is not limited to the method exemplified herein but may be modified in various manners. That is to say, the index detecting unit 331 may extend the index range from indexes positioned apart by a difference of ±2.

In addition, when the respective sides of the lattice unit spaces have different lengths, first of all, the index detecting unit 331 may extend the index range from the axis along which the longest side length is indicated.

If the index B having a cluster created thereat is detected by the index detecting unit 331, position information of a representative value existing in the lattice unit space indicated by the index B can be obtained. The first distance calculating unit 332 may calculate a distance $D_1$ between the representative value existing in the lattice unit space indicated by the detected index B and the new data.

The second distance calculating unit 333 may detect an index (index C) corresponding to the lattice-type segmented space where all or some of the lattice unit spaces exist within a range of the distance $D_1$ calculated by the first distance calculating unit 332 based on the input position of the new data. In addition, when a cluster exists in the lattice unit space indicated by the detected index (index C), the second distance calculating unit 333 may calculate a distance $D_2$ between the representative value of the cluster existing in the detected index C and the new data.

The label setting unit 334 may set label information of the new data using the label information of the representative value having the shortest distance from the distance $D_1$ calculated by the first distance calculating unit 332 and the distance $D_2$ calculated by the second distance calculating unit 333.

FIG. 6 illustrates an example of a label setting unit detecting a representative value closest to new data.

An example of the label setting unit 334 detecting a representative value closest to new data will now be described with reference to FIG. 6.

In FIG. 6, a space for clustering is a 2D space defined by first and second axes, including a lattice-type segmented space having lattice unit spaces set with different indexes from (1,1) to (100,100). Here, it is assumed that input new data ($N_1$) is normalized by the normalization unit 220.

If the new data $N_1$ is input, the index discriminating unit 310 discriminates an index corresponding to the input position of the new data $N_1$. The index corresponding to the input position of the new data $N_1$ may be obtained using Equation (3). In FIG. 6, the index discriminated by the index discriminating unit 310 is (3,3).

The index detecting unit 331 detects an index having a cluster created thereat while extending an index range to an index close to the discriminated index (3,3). Referring to FIG. 6, the index detecting unit 331 decreases first the index indicated along the first axis by 1 and then detects the index having a cluster created thereat while extending the index range in a clockwise direction. Therefore, the index detecting unit 331 detects the index having a cluster created thereat while extending the index range while extending the index range in sequence from ① (the index of the first axis decreased by 1, i.e., −1, from the discriminated index (3,3)) to ② (the index of the first axis decreased by 1. i.e., −1, and increased by 1, i.e., +1, from the discriminated index (3,3), and to ③ (only the index of the second axis increased by 1. i.e., +1, from the discriminated index (3,3)). The extending of the index range by the index detecting unit 331 may be different from that stated above.

The index detecting unit 331 may also detect an index (3,4) having a cluster created thereat by process ③.

The first distance calculating unit 332 may calculate a distance $D_1$ between the representative value $RV_5$ included in the cluster created at the index (3,4) and the new data $N_1$.

The second distance calculating unit 333 detects all indexes corresponding to the lattice-type segmented space where all or some of the lattice unit spaces exist within a range of the distance $D_1$ calculated by the first distance calculating unit 332 based on the input position of the new data $N_1$. In FIG. 6, the indexes detected by the first distance calculating unit 332 are (2,2), (2,3), (3,1), (3,2), (3,4), (4,1), (4,2), (4,3), (4,4), (5,2), and (5,3).

In addition, the second distance calculating unit 333 may determine indexes (2,2), (4,2), (3,4) and (4,3) having representative values by the clusters created at the detected indexes (2,2) to (5,3) and may calculate a distance between each of the representative values $RV_2$, $RV_3$, $RV_4$, and $RV_5$ and the new data $N_1$. The second distance calculating unit 333 may not calculate a distance between $RV_5$ obtained by the first distance calculating unit 332 and the new data $N_1$.

The label setting unit 334 may set label information of the new data $N_1$ using label information of the representative value $RV_3$ having the shortest distance $D_3$ among the distances between each of the representative values $RV_2$, $RV_3$, $RV_4$, and $RV_5$ and the new data $N_1$.

FIG. 6 illustrates a case where a cluster is not created at the input position of the new data $N_1$. In a case where there is a previously created cluster at the input position of the new data and a representative value exists at the cluster, the operation of the label setting unit 334 will be described with reference to FIG. 7.

A procedure of the label setting unit 334 tracing a representative value that is closest to an input position of new data when new data is input to lattice unit spaces having clusters set thereto will now be described with reference to FIG. 7.

The first distance calculating unit 332 calculates the distance $D_1$ between the new data $N_1$ and a yet-to-be-changed representative value $RV_7$ of the cluster created at the lattice unit space indicated by the index corresponding to the input position of the new data $N_1$. Here, it is not necessary for the index detecting unit 331 to perform index extension and detection.

However, the first distance calculating unit 332 does not necessarily calculate the distance between the new data $N_1$ and the yet-to-be-changed representative value $RV_7$. Rather, the first distance calculating unit 332 may calculate the distance between the new data $N_1$ and a representative value changed according to the environment of a system adopting the present invention or user's intention or purpose.

The second distance calculating unit 333 detects indexes (2,2), (2,3), (3,2), (3,4), (4,2), (4,3) and (4,4) corresponding to the lattice-type segmented space where all or some of the lattice unit spaces exist within a range of the distance $D_1$ obtained by the first distance calculating unit 332 based on the input position of the new data $N_1$.

In addition, the second distance calculating unit 333 calculates a distance $D_3$ between the new data $N_1$ and a representative value $RV_3$ and a distance $D_2$ between the new data $N_1$ and a representative value $RV_4$, which exist in the lattice unit spaces corresponding to the detected indexes.

The label setting unit 334 may set attribute information of the new data $N_1$ using attribute information of the representative value $RV_3$ corresponding to the smallest distance $D_3$ among the calculated distances $D_1$, $D_2$ and $D_3$.

Next, referring to FIG. 7, the space for clustering is a 2D space, and the respective sides of the lattice unit spaces have the same length. Alternatively, when a cluster is created in the lattice unit space indicated by the index corresponding to the input position of the new data and a representative value exists in the created cluster, the label setting unit 334 may detect a representative value closest to the input position of the new data, which will now be described.

The label setting unit 334 obtains distances between the input position of new data and each of the representative values existed in 8 neighboring indexes based on the index A discriminated by the index discriminating unit 310. In addition, the label setting unit 334 may detect a representative value closest to the input position of new data by obtaining the distances between the input position of new data and each of the representative values existed in 8 neighboring indexes, biased from the discriminated index A. That is to say, the label setting unit 334 may detect a representative value closest to the input position of new data just by computing distances between the input position of new data and representative values existing in 14 indexes in total, including the index at which the new data is positioned and excluding repeated indexes, which will now be described with reference to FIG. 7.

If there is a previously created cluster at the index (3,3) corresponding to the input position of new data $N_1$, the label setting unit 334 may obtain distances between the new data $N_1$ and representative values existing at 8 indexes (2,2), (2,3), (2,4), (3,2), (3,4), (4,2), (4,3), and (4,4), which are close to the index (3,3). In addition, the label setting unit 334 may obtain distances between the new data $N_1$ and representative values existing at 8 indexes (3,1), (3,2), (3,3), (4,1), (4,3), (5,1), (5,2), and (5,3), which are close to the index (4,2) biased from the index (3,3). The label setting unit 334 may set label information of new data $N_1$ using label information of the representative value having the shortest distance among the obtained distances. Through the above-stated procedure of the label setting unit 334, as shown in FIG. 6, it is understood that the representative value $RV_3$ of the index (4,2) is closest to the new data $N_1$.

As the discrimination result by the index discriminating unit 310, when the index corresponding to the input position of new data does not belong to one among indexes (index group) set lattice-type segmented space, a mapping unit 335 of the label unit 330 maps the input position of the new data to the closest position in the lattice-type segmented space. In addition, an external cluster storage unit 336 of the label unit 330 may store information on clusters created by the clustering unit 320 at an external space of the lattice-type segmented space.

The external cluster storage unit 336 may store information regarding the index and the representative value of the cluster created at the external space of the lattice-type segmented space, and position information of the representative value.

In forming a lattice-type segmented space, as the amount of information collected is increased and the time taken for collecting the information is extended, the number of clusters created at the external space of the lattice-type segmented space will be statistically reduced. Therefore, the amount of information stored in the external cluster storage unit 336 is smaller than that of the data input to the lattice-type segmented space. Accordingly, in a case where new data is input to the external space of the lattice-type segmented space, a computational quantity may not be considerably affected by the calculating of the distances between the new data and all of the representative values stored in the external cluster storage unit 336.

However, if the amount of data stored in the external cluster storage unit 336 exceeds a preset level, a size of the lattice-type segmented space may be determined again by the determining unit 230 by combining the pieces of data collected after the data is used in determining the size of the lattice-type segmented space.

Separately from the label unit 330 calculating the distances between the new data and all of the representative values stored in the external cluster storage unit 336, the mapping unit 335 may map the input position of the new data to the closest a position of the lattice-type segmented space.

In detail, the mapping unit 335 may map a value corresponding to each dimension of the new data to a minimum value when the value corresponding to each dimension of the new data is less than or equal to a minimum value of the lattice-type segmented space having the different indexes, to a maximum value when the value corresponding to each dimension of the new data is greater than or equal to a maximum value of the lattice-type segmented space, and to an original value when the value corresponding to each dimension of the new data is between the minimum value and the maximum value of the lattice-type segmented space.

When the mapping unit 335 maps the input position of the new data to the closest position in the lattice-type segmented space, the closest representative value can be detected as described above. That is to say, the index discriminating unit 310 discriminates an index corresponding to the mapped position resulting from the mapping by the mapping unit 335, a representative value that is closest from mapped positions of the index detecting unit 331, the first distance calculating unit 332, the second distance calculating unit 333 and the label setting unit 334 can be detected using the discriminated index.

The label setting unit 334 may set the label information of the new data using the label information of the representative value having the shortest distance from the distance between the mapping position and the closest representative value and the distance between the new data and the representative value stored in the external cluster storage unit 336.

In a case where the new data is input to the external space of the lattice-type segmented space, the operation of the label setting unit 334 will now be described in detail with reference to FIG. 8.

As shown in FIG. 8, as the discrimination result of the index discriminating unit 310 discriminating the index corresponding to the input position of new data $N_1$, the index corresponding to the input position of new data $N_1$ is an index existing outside the lattice-type segmented space. Therefore, the mapping unit 335 moves the input position of new data $N_1$ to the closest position of the lattice-type segmented space. In FIG. 8, the closest position of the lattice-type segmented space may correspond to a value of an ordered pair (a maximum value of the first axis in the lattice-type segmented space, a maximum value of the second axis in the lattice-type segmented space). Here, a changed position, resulting from the moving of the position of the new data $N_1$, is denoted by $N_1'$.

The index discriminating unit 310 may discriminate an index corresponding to the position of the new data $N_1'$, whose position is moved by the mapping unit 335. The index corresponding to the position of the index new data $N_1'$, discriminated by the discriminating unit 310, is (100,100).

According to whether there is a previously created cluster at the index (100,100), as described above with reference to FIGS. 6 and 7, the label setting unit 334 may detect one among representative values existing in the lattice-type segmented space, the one having the shortest distance $D_{N1}$ from the new data $N_1'$.

In more detail, when an index corresponding to the input position of the new data exists outside the lattice-type segmented space and a cluster is previously created thereat, the clustering unit 320 may change an old representative value of the previously created cluster using the new data. In addition, as shown in FIG. 7, the label unit 330 may detect a representative value that is closest to the new data.

When an index corresponding to the input data of the new data exists outside the lattice-type segmented space and no cluster is created thereat, the clustering unit 320 may create a new cluster in a space indicated by the index using the new data as a representative value. In addition, as shown in FIGS. 6 and 7, the label unit 330 may detect a representative value that is closest to a position mapped by the mapping unit 335. In addition, when an index corresponding to the input data of the new data exists outside the lattice-type segmented space and no cluster is created thereat, the label setting unit 334 may obtain information on a distance $D_{N1}$ between each of representative values $RV_a$, $RV_b$, and $RV_c$ of clusters created at an external space and the new data $N_1$ using the information of the external cluster storage unit 336. The label setting unit 334 may set label information of the new data $N_1$ using the label information of the representative value having the shorter one of the distances $D_{N1'}$ and $D_{N1}$.

FIG. 9 is a flowchart of a data clustering method according to an embodiment of the present invention.

Referring to FIG. 9, in the clustering method according to an embodiment of the present invention, the index discriminating unit 310 discriminates an index corresponding to a position of new data input to a space for data clustering, including a lattice-type segmented space having lattice unit spaces set with different indexes (S910).

Index discriminated the index discriminating unit 310 is positioned in the lattice-type segmented space (S920), and if a cluster is created at the discriminated index, the clustering unit 320 allows the new data to be included in the created cluster and the clustering unit 320 changes a representative value of the cluster created in the lattice unit space indicated by the discriminated index using the new data (S960).

Before the clustering unit 320 changes an old representative value, the first distance calculating unit 332 calculates a distance between the new data and the old representative value (S940).

The second distance calculating unit 333 detects an index corresponding to the lattice-type segmented space where all or some of the lattice unit spaces exist within a range of the distance $D_1$ calculated by the first distance calculating unit 332. In addition, when a cluster exists in the lattice unit space indicated by the detected index, the second distance calculating unit 333 may calculate a distance between the representative value of the cluster existing in the detected index and the new data.

The label setting unit 334 detects a representative value corresponding to the shortest distance using the distance calculated by the first distance calculating unit 332 and the distance calculated by the second distance calculating unit 333 (S950). In addition, the label unit 330 may set label information of new data using label information of the detected representative value corresponding to the shortest distance (S990).

On the other hand, when a cluster does not exist in the lattice unit space indicated by the detected index, the clustering unit 320 creates a new cluster in the lattice unit space indicated by the discriminated index corresponding to the input position of the new data using the new data as a representative value (S930 and S970).

The index detecting unit 331 detects a representative value by detecting an index having a cluster created thereat while extending the index range based on the discriminated index, and the first distance calculating unit 332 obtains a distance between the detected representative value and the input position of the new data. The second distance calculating unit 333 detects an index (index K) corresponding to the lattice-type segmented space where all or some of the lattice unit spaces exist within a range of the distance calculated by the first distance calculating unit 332 based on the input position of the new data. In addition, if a cluster is created in the lattice unit space indicated by the detected index K, the second distance calculating unit 333 calculates a distance between the representative value of the cluster existing in the detected index K and the new data. The label setting unit 334 may set label information of the new data using the label information of the representative value having the shortest distance from the distance calculated by the first distance calculating unit 332 and the distance calculated by the second distance calculating unit 333 (S980). In addition, the label unit 330 may set label information of the new data using the label information of the detected representative value that is closest to the new data (S990).

FIG. 10 is a flowchart of a data clustering method according to another embodiment of the present invention.

Referring to FIG. 10, in the data clustering method according to another embodiment of the present invention, the index discriminating unit 310 discriminates an index corresponding to a position of new data input to a space for data clustering, including a lattice-type segmented space having lattice unit spaces set with different indexes (S910).

Index discriminated the index discriminating unit 310 that the discriminated index is not positioned in the lattice-type segmented space and no cluster is created at the discriminated index (S1010 and S1020), and the clustering unit 320 creates a new cluster in the lattice unit space indicated by the discriminated index using the new data as a representative value (S1030).

The label setting unit 334 calculates a distance between the input position of the new data and the representative value stored in the external cluster storage unit 336 (S1040).

The mapping unit 335 maps the input position of the new data to the closest position in the lattice-type segmented space. According to whether a cluster is created at the mapped position, the label setting unit 334 may detect a representative value having the shortest distance from the mapped position by performing operations S940 to S960 or operations S970 to S980 (S1050).

The label setting unit 334 may set label information of the new data using label information of the representative value detected through the operations S1040 and S1050 (S990).

On the other hand, when a cluster does not exist in the lattice unit space indicated by the index discriminated by the index discriminating unit 310 and a cluster is created in the lattice unit space indicated by the discriminated index, the clustering unit 320 allows the new data to be included in the created cluster. In addition, the clustering unit 320 may change an old representative value existing in the discriminated index using the new data (S1010, S1020 and S1070).

Before the clustering unit 320 changes the old representative value, the label unit 330 detects a representative value having the shortest distance from the new data (S1060). However, the operation of the clustering unit 320 changing the old representative value and the operation of the label unit 330 detecting a representative value having the shortest distance from the new data may not be necessarily performed in that order but may be performed in a reverse order. The label unit 330 preferably detects the representative value closest to the new data using a distance between the old representative value, rather than the representative value changed by the clustering unit 320, and the new data.

In detail, the first distance calculating unit 332 of the label unit 330 may obtain the distance between the old representative value and the new data. The second distance calculating unit 333 of the label unit 330 may obtain a distance between the new data and each of representative values existing in indexes corresponding to the lattice-type segmented space where some of the lattice unit spaces exist within a range of the distance calculated by the first distance calculating unit 332.

The label setting unit 334 of the label unit 330 may set label information of new data using label information of the detected representative value corresponding to the shortest distance among the distances calculated by the first distance calculating unit 332 and the second distance calculating unit 333 (S990).

The data clustering apparatus 300 and the data clustering method according to the embodiment of the present invention 300 can reduce a computational quantity required for data clustering, compared to the conventional data clustering method.

In addition, the data clustering apparatus 300 and the data clustering method according to the present invention can rapidly and accurately clustering large-scale data, compared to the conventional clustering method.

In addition, the data clustering apparatus 300 and the data clustering method according to the present invention can rapidly and accurately clustering scattered data, which is difficult to be clustered, using the conventional clustering method.

Further, the data clustering apparatus 300 and the data clustering method according to the present invention can detect a representative value that is closest to newly input data using a reduced computational quantity, compared to the conventional clustering method.

In addition, label information of a representative value closest to newly input data can be used in setting label information of the newly input data.

Various components shown in FIGS. 2, 3 and 5 may mean software or hardware such as field programmable gate arrays (FPGAs) or application specific integrated circuits (ASICs). However, the components are not limited to software or hardware but may be configured to reside in an addressable storage medium or to execute one or more processors. Functions provided in the components may be implemented by subdivided components and may also be implemented as a component performing a particular function by combining multiple components.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A building energy management apparatus comprising:
    at least one processor configured to execute:
        a receiving unit receiving data from a plurality of sensors installed inside or outside of a building;
        an index discriminating unit discriminating an index (index A) corresponding to an input position of the data, the data being input to a multi-dimensional space for data clustering, including a lattice-type segmented space having lattice unit spaces set with different indexes; and
        a clustering unit, when a cluster is not created at the discriminated index (index A), creating a new lattice-type segmented cluster using the data as a representative value of the new cluster, and allowing the data to be included in the new cluster, when a cluster is already created at the discriminated index (index A), allowing the data to be included in a lattice-type segmented cluster already created in a lattice unit space, and changing an old representative value (RVO) of the already created cluster using the data,
    wherein the data is generated by the sensors based on at least one of various kinds of information which the sensors detect, time when the sensors operate, and location where the sensors are installed,
    wherein the clustering unit creates the clusters for clustering the data,
    wherein the building energy management apparatus manages a building energy consumption by using clustering results of the clustering unit,
    wherein the index discriminating unit discriminates an index of the data using a value obtained by dividing a difference between the data and a minimum value among values positioned in the lattice-type segmented space by a difference between a maximum value among values positioned in the lattice-type segmented space and the minimum value among values positioned in the lattice-type segmented space, and then multiplying a divided result with an inverse number of a total number of different indexes set to each of the lattice unit spaces.

2. The building energy management apparatus of claim 1, wherein the lattice-type segmented space is produced by normalizing values of the data received before the data is input, determining a space size using a minimum value and a maximum value of the normalized data in each axis forming the space for data clustering and dividing the size-determined space according to a predetermined level of sensitivity.

3. The building energy management apparatus of claim 2, wherein the data is normalized data produced by normalization.

4. The building energy management apparatus of claim 1, wherein when the cluster is not created at the discriminated index (index A), the processor further executes:
    a label unit, detecting a representative value closest to the input position of the data using the discriminated index (index A) and different indexes set to each of the lattice unit spaces and setting label information of the data using label information of the detected representative value.

5. The building energy management apparatus of claim 4, wherein the label unit comprises:
    an index detector configured to detect an index having the cluster created (index B) thereat while extending an index range beyond an index close to the discriminated index (index A);
    a first distance calculator configured to calculate a distance $D_1$ between the representative value included in the cluster created at the index (index B) detected from the index detector and the data;
    a second distance calculator configured to detect an index (index C) corresponding to the lattice-type segmented space where at least some of the lattice unit spaces exist within a range of the distance $D_1$ calculated by the first distance calculator based on the input position of the data and calculating a distance $D_2$ between the representative value of the cluster existing in the detected index (index C) and the data; and
    a label setter configured to set label information of the data using label information of a representative value having a shortest distance from the distance $D_1$ calculated by the first distance calculator and the distance $D_2$ calculated by the second distance calculator.

6. The building energy management apparatus of claim 4, wherein when the discriminated index (index A) does not belong to one among different indexes set to each of the lattice unit spaces,
    the label unit includes a mapper configured to map the input position of the data to a closest position in the lattice-type segmented space,
    the index discriminating unit discriminates an index corresponding to a mapped position,
    the label unit detects a representative value (RV mapping) that is closest to a mapped position using the index corresponding to the mapped position and different indexes set to each of the lattice unit spaces, and sets label information of the data using label information of the detected representative value (RV mapping).

7. The building energy management apparatus of claim 6, wherein the label unit maps a value corresponding to each dimension of the data: to a minimum value when the value corresponding to each dimension of the data is less than or equal to a minimum value of the lattice-type segmented space having the different indexes, to a maximum value when the value corresponding to each dimension of the data is greater than or equal to a maximum value of the lattice-type segmented space, and to an original value when a value corresponding to each dimension of the data is between the minimum value and the maximum value of the lattice-type segmented space.

8. The building energy management apparatus of claim 6, wherein when a new cluster (cluster OA) is created at an external space of the lattice-type segmented space having the different indexes in the space for clustering by the clustering unit, the building energy management apparatus further comprises an external cluster storage configured to store information related to the new cluster (cluster OA) created at an external space of the lattice-type segmented space; and when the discriminated index (index A) corresponding to the input position of the data input after the information related to the new cluster is stored in the external cluster storage does not belong to one among different indexes set to each of the lattice unit spaces and has no cluster created thereat, the clustering unit creates a new cluster using the data as a representative value, and the label unit detects a representative value (RV least) of a cluster that is closest to the input position of the data using the information stored in the external cluster storage and sets label information of the data using label information of a representative value of a cluster that is closer to the data, among representative values mapped to the index that is closest to the representative value (RV mapping).

9. The building energy management apparatus of claim 1, wherein when the cluster is already created at the discriminated index (index A) the clustering unit changes the old representative value ($RV_O$) to a value obtained using an internal dividing point between the data and the old representative value based on a number of data in the cluster created at the discriminated index (index A).

10. The building energy management apparatus of claim 1, wherein when the cluster is already created at the discriminated index (index A), the processor further executes:

a first distance calculator configured to calculate a distance $D_1$ between the old representative value ($RV_O$) included in the cluster created at the discriminated index (index A) and the data;

a second distance calculator configured to detect an index (index C) corresponding to the lattice-type segmented space where at least some of the lattice unit spaces exist within a range of the distance $D_1$ calculated by the first distance calculator based on the input position of the data and calculating a distance $D_2$ between a representative value of the cluster existing in the detected index (index C) and the data; and a label setter configured to set label information of the data using the label information of a representative value having a shortest distance from the distance $D_1$ calculated by the first distance calculator and the distance $D_2$ calculated by the second distance calculator.

11. The building energy management apparatus of claim 10, wherein when the discriminated index (index A), does not belong to one among different indexes set to each of the lattice unit spaces, the clustering unit changes an old representative value ($RV_O$) of the cluster created at an external space of the lattice-type segmented space indicated by the discriminated index using the data, and the building energy management apparatus further comprising an external cluster storage configured to store information related to the changed representative value of the cluster created at the external space of the lattice-type segmented space.

* * * * *